(12) United States Patent
Schuurs

(10) Patent No.: US 8,172,081 B2
(45) Date of Patent: May 8, 2012

(54) HOUSING FOR A DISC-SHAPED INFORMATION CARRIER

(75) Inventor: Johannes Adrianus Maria Schuurs, Kapellen (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1672 days.

(21) Appl. No.: 10/546,315

(22) PCT Filed: Feb. 13, 2004

(86) PCT No.: PCT/IB2004/050114
§ 371 (c)(1),
(2), (4) Date: Aug. 19, 2005

(87) PCT Pub. No.: WO2004/077437
PCT Pub. Date: Sep. 10, 2004

(65) Prior Publication Data
US 2006/0060483 A1   Mar. 23, 2006

(30) Foreign Application Priority Data
Feb. 28, 2003   (EP) ..................................... 03100499

(51) Int. Cl.
*B65D 85/57*   (2006.01)

(52) U.S. Cl. ...................... 206/308.1; 206/309; 220/836

(58) Field of Classification Search ............... 206/308.1, 206/309, 310, 311, 312, 387.13; 220/4.22, 220/836, 841, 845
See application file for complete search history.

(56) References Cited

U.S. PATENT DOCUMENTS

| 5,803,251 | A | * | 9/1998 | Gartz ............................. 206/310 |
| 5,890,590 | A | * | 4/1999 | Doodson ..................... 206/308.1 |
| 6,000,537 | A | * | 12/1999 | Doodson ....................... 206/232 |
| 2001/0001442 | A1 | * | 5/2001 | Liu ............................. 206/308.1 |
| 2003/0024832 | A1 | * | 2/2003 | Kwok-Din ................. 206/308.1 |
| 2003/0034257 | A1 | * | 2/2003 | Rufo et al. ................. 206/308.1 |
| 2004/0118716 | A1 | * | 6/2004 | Watson et al. ............. 206/308.1 |

* cited by examiner

*Primary Examiner* — David Fidei

(57) ABSTRACT

A housing for storing a disc-shaped information carrier includes a bottom part with a retaining device for the information carrier and a lid part which is connected with hinging possibility to the bottom part via two corner hinges. The corner hinges have two recessed hinge arms of the hinge part and two matching recessed hinge walls. The lid part is provided with protection walls which extend at the outside of the housing substantially parallel to the hinge arms so as to protect the hinge arms from external mechanical influences. The distance between each hinge arm and the facing parallel portion off its opposite protection wall has a value lying in the range between 6.6 mm and 13.1 mm.

20 Claims, 4 Drawing Sheets

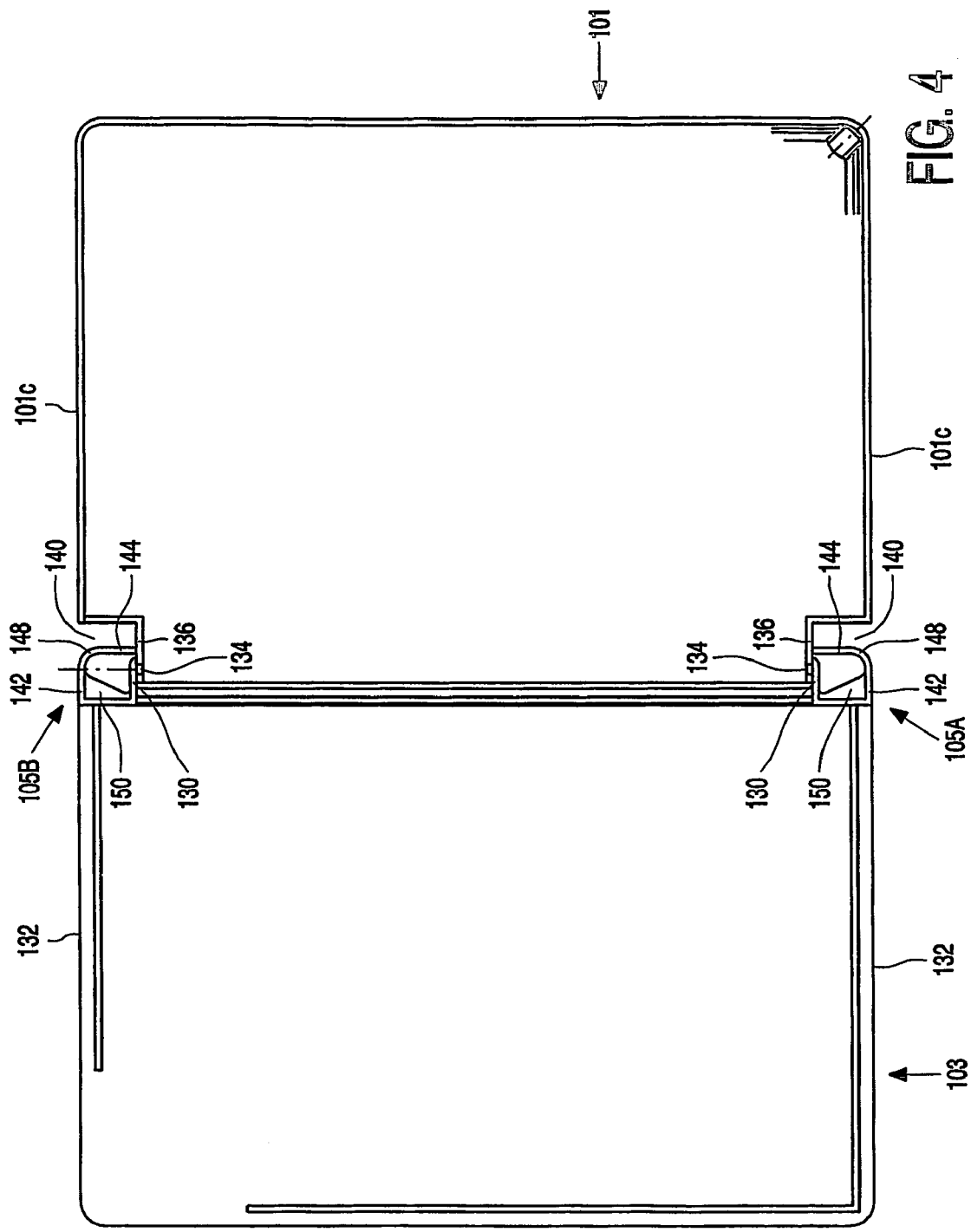

HOUSING FOR A DISC-SHAPED INFORMATION CARRIER

Figure 1:
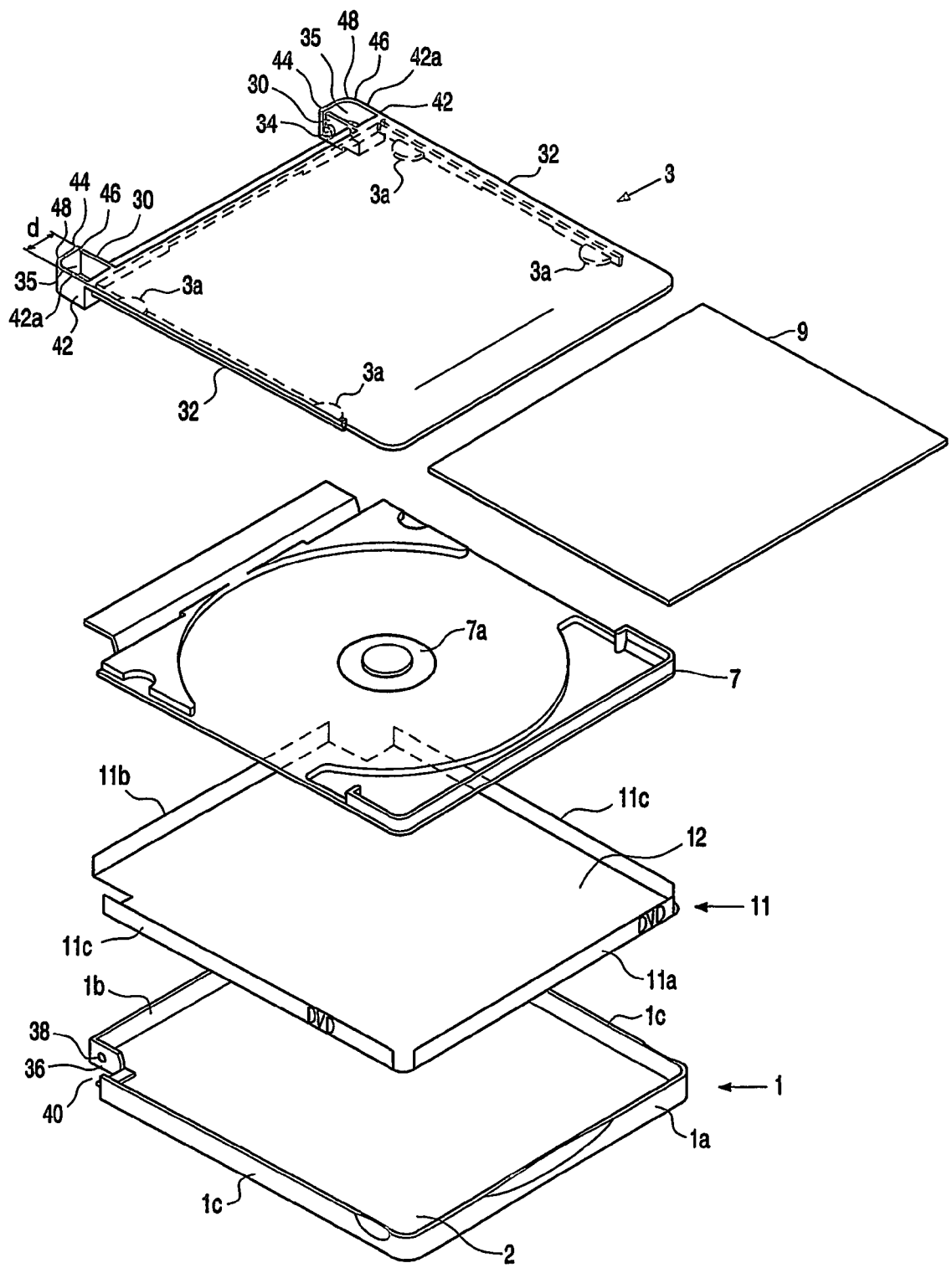

The invention relates to a housing for storing a disc-shaped information carrier, provided with a bottom part, a retaining device for retaining the information carrier, and a lid part connected to the bottom part by means of two corner hinges, which lid part comprises two hinge structures each provided with a recessed hinge arm which is recessed with respect to a lateral side of the lid part, and with a protection wall present opposite said hinge arm and having a wall portion extending substantially parallel to said hinge arm and at said lateral side of the lid part, and which bottom part is provided with two corner recesses which match the recessed hinge arms and in which the hinge arms extend, said corner recesses being bounded by recessed hinge walls which are each recessed with respect to a lateral side of the bottom part, while the recessed hinge arms are coupled with rotation possibility to the recessed hinge walls for forming said corner hinges.

The PCT Patent application WO 99/17291 discloses a housing for storing one or more disc-shaped information carriers, for example a DVD. The housing is provided with a bottom part, a retaining device present in the bottom part for retaining the information carrier, and a lid part which is rotatably connected to the bottom part. The lid part is provided with two recessed hinge arms which are each recessed with respect to a lateral side of the lid part. The bottom part is provided with two corner recesses which match the recessed hinge arms and in which the hinge arms extend. The corner recesses are bounded by recessed hinge walls which are each recessed with respect to a lateral side of the bottom part. The recessed hinge arms are provided with hinge studs extending into openings of the recessed hinge walls for forming corner hinges. The lid part is provided with two protection walls, each present opposite a respective hinge arm, which extend substantially at the lateral sides of the lid part.

The lid part of the known housing is an injection-molded product and has been made from polypropylene. It was found that the time needed for molding a lid part is rather long. As the housing is meant for mass production it will be clear that the cycle time of the molding process is an essential parameter in the manufacture of the housing, particularly with respect to the number of molded lid parts per time unit.

The invention has for its object to improve the housing of the kind mentioned in the opening paragraph such that it can be produced in a shorter time.

This object is achieved by the housing according to the invention, which is characterized in that the distance between the recessed hinge arm and the wall portion in each hinge structure has a value which is equal to or greater than 6.6 mm.

Owing to the special positioning of the hinge arms and the hinge walls of the housing to which the invention relates, the corner hinges lie recessed with respect to the lateral contours of the housing formed by the lateral sides of the bottom part and the lid part. The corner hinges are in addition protected by the protection walls extending along the hinge walls. As a result of this, the housing and more in particular the hinges thereof are very well resistant to mechanical external influences caused by, for example, dropping or impacts. The housing according to the invention is suitable for storing disc-shaped information carriers such as optical or magneto-optical discs, for example provided with audio, video, or data information.

It has been experimentally proven that the cycle time for molding a lid part can be substantially shortened by the distance applied between the hinge arm and the wall portion in each hinge structure. It was found that the time needed for manufacturing a lid part of the known housing by means of injection molding is 6.2 s. With the same kind of mold, the time needed for manufacturing a lid part of the housing according to the invention is only 5.6 s. Thus a time reduction of about 10% is attainable without changing the molding process as such. This leads to a considerable saving in production cost. The mentioned effect cannot be obtained if the distance is below 6.6 mm or above 13.1 mm. A practical upper value for the distance is 13.1 mm.

A practical embodiment of the housing according to the invention has the characteristic that the distance between the hinge arm and the wall portion in each hinge structure is 9.8 mm. The lid part is preferably plate-shaped and preferably has two areas or faces defined by and covering hinge structures. Such areas are particularly suitable for displaying signs, such as a logo or a trademark.

The housing preferably has the feature that the hinge arm or the hinge wall of each corner hinge is provided with a stud or a round pin which projects into an opening of the corresponding hinge wall or hinge arm not provided with a stud. The hinge arms and the hinge walls are thus coupled to one another with hinging possibility in a simple and reliable manner. To facilitate the fastening of the lid to the bottom part, the hinge arms are preferably resilient in directions towards one another and/or away from one another, whereas the hinge walls are rigid. The studs or rounds pins are preferably present on the hinge arms and can be easily inserted into the openings, which are present in the hinge walls in this case, during the assembling process of the housing. After assembly, the resilient hinge arms ensure that the studs or pins remain locked in the openings. The bottom part is usually given a box shape and is provided with vertical side walls. The recessed hinge walls are preferably formed by wall portions shifted to the inside with respect to said side walls in such a bottom part.

The protection walls of the hinge structures are preferably of a resilient construction. A somewhat yielding, and accordingly particularly effective protection of the corner hinges is achieved thereby. The protection walls are preferably resilient in directions towards one another and away from one another.

The protection walls may extend entirely within the outer contours of the housing, wherein the protection walls extend in the corner recesses of the bottom part. The protection walls preferably lie in the extended directions of the side walls of the bottom part in the case of a bottom part having a box shape.

The protection walls are preferably each provided with a free end portion, which free end portions are bent towards one another and each extend opposite to and at a distance from a free end of one of the hinge arms. This provides a maximum protection for the corner hinges.

Each of the protection walls is preferably provided with a fluently curved portion which merges into the end portion and which forms a rounded transition between one of the lateral sides of the bottom part and a rear side of the bottom part at least when the lid part is in a closed position. The round transitions thus obtained form an ideal possibility for giving corner portions of the housing present adjacent the corner hinges rounded angles. Rounded angles render the housing more customer-friendly on account of the absence of sharp corner portions and are better resistant to damage than are straight angles. Preferably, therefore, all corners of the housing are rounded-angle corners.

The lid part is preferably constructed as one product, in particular an injection-molded product. The bottom part preferably also is one injection-molded product. This renders a simple manufacture of the total housing possible, including the hinging device. The housing is preferably made from a transparent material so as to maximize the possibility of accommodating in the housing information which is legible from the outside. A suitable material is, for example, polystyrene.

It is to be noted that variants of the housing according to the invention are also possible which are provided with a combination of features described above.

The housing according to the invention may have external dimensions which substantially correspond to those of the generally known CD jewel box, i.e. a depth of 142 mm, a width of 124 mm and a height of 10 mm. Another suitable size of the housing according to the invention is defined by a depth of 190 mm, a width of 142 mm and a height of 10 mm.

Figure 2:
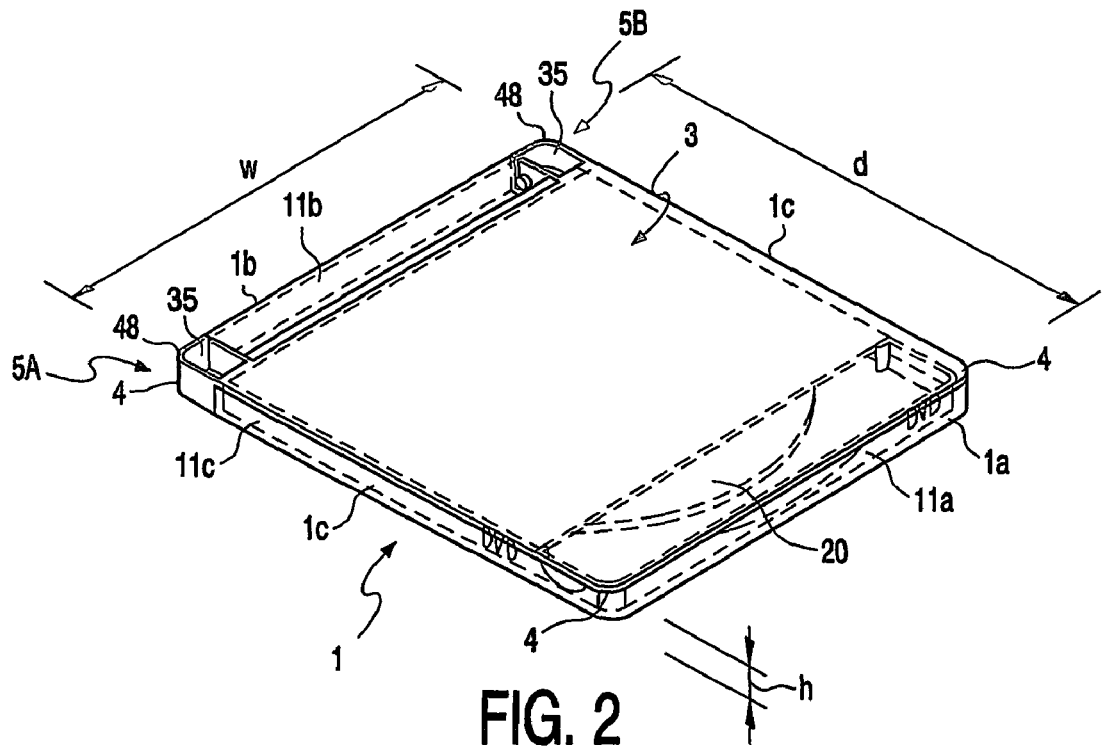
Figure 3:
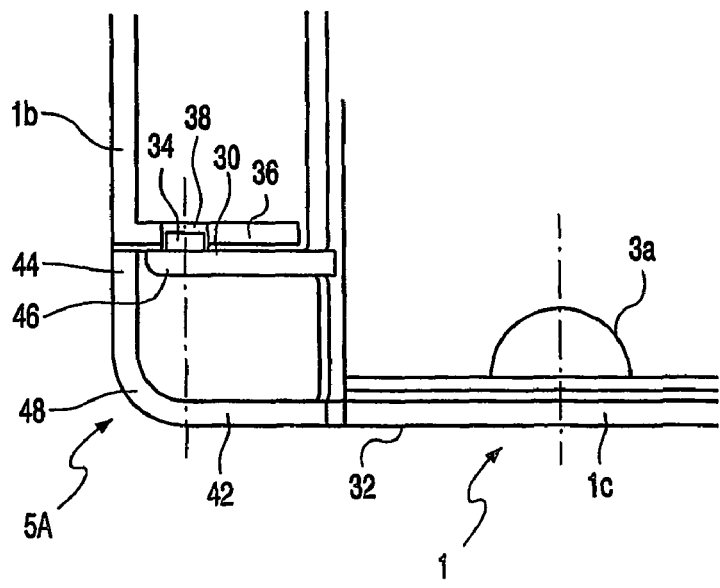
Figure 5B:
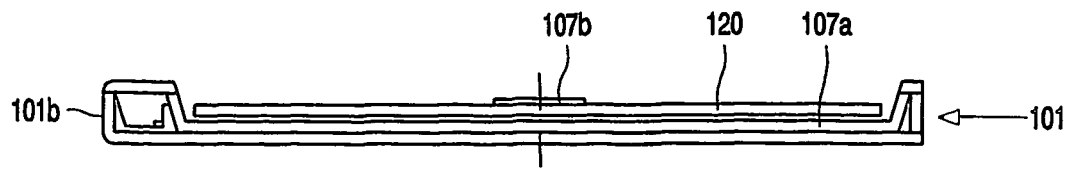
Figure 5A:
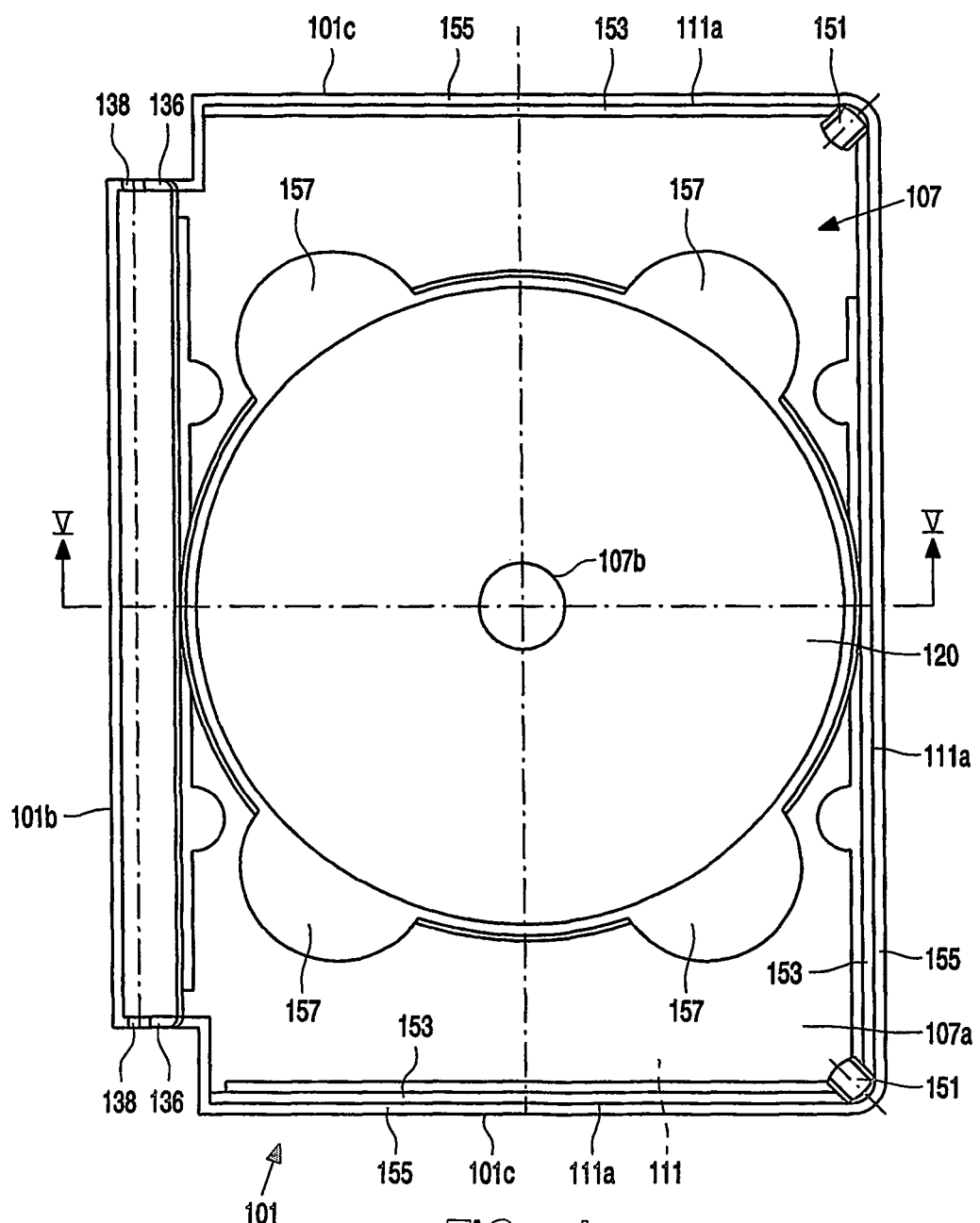

The invention will be explained in more detail by way of example with reference to the drawing, in which FIG. 1 is an exploded view of a first embodiment of the housing according to the invention, FIG. 2 is a perspective view of the first embodiment in a closed state, FIG. 3 shows a portion of the housing provided with a corner hinge on an enlarged scale, FIG. 4 is a plan view of a second embodiment of the housing according to the invention, comprising a bottom part and a lid part in an opened state, FIG. 5A is a plan view showing the bottom part of the second embodiment, provided with a retaining device, and FIG. 5B shows said bottom part in a cross-section taken on the line V-V in FIG. 5A.

The housing according to the invention shown in FIGS. 1 and 2 is suitable for the storage of an optical information carrier 20, in this example a DVD provided with audio information. Such an information carrier has one or several optically writable and/or readable information layers and is provided with a central opening. The housing, which is constructed in two parts, comprises a bottom part 1 and a plate-shaped lid part 3 which are interconnected with hinging possibility by means of corner hinges 5A and 5B. The bottom part 1 comprises a retaining device 7, in this example an inlay tray, with a central clamping device 7a for retaining the information carrier with clamping force, such that the central clamping device 7a projects into the central opening of the information carrier in the clamped state. The retaining device may also form an integral portion of the bottom part in an alternative embodiment.

The bottom part 1 has a box shape, is open at one side, and is provided with a bottom wall 2, a front wall 1a and a rear wall 1b which are perpendicular to the bottom wall 2, and two side walls 1c which are perpendicular to the bottom wall 2. The front wall 1a, the rear wall 1b, and the side walls 1c, which all have the same height, are transparent and substantially uninterrupted over at least the major portion of their length. In this example, the bottom wall 2 is also transparent. The rear wall 1b forms a rear end of the housing, adjacent which rear end the hinges 5A and 5B are present The lid part 3 substantially has a plate shape, is transparent, and in the present example is provided with tags 3a at the side facing the bottom part 1 for retaining an inserted information booklet or leaflet 9. In this example, the housing has the following external dimensions: a depth d of 142 mm, a width w of 124 mm, and a height h of 10 mm. The housing is provided with rounded corners 4.

An insert 11 is present in the present embodiment of the housing according to the invention, extending in the bottom part 1, in particular on the bottom wall 2. The insert 11 in this example comprises four upright portions, i.e. a portion 11a extending opposite the front wall 1a, a portion 11b extending opposite the rear wall 1b, and two portions 11c extending opposite the side walls 1c. The sides of the upright portions 11a, 11b, and 11c facing the transparent walls 1a, 1b, and 1c are provided with printed information relating to the information carrier 20 belonging to the housing. The upright portions 11a, 11b, and 11c preferably form an integral whole with a main portion 12 of the insert and are bent relative to the latter about folding lines. The insert 11 may be made from paper, from a synthetic resin, or from some other suitable material.

As is apparent from the drawing, the insert 11 fully inside the bottom part 1, the main portion 12 in this example extending between the bottom wall 2 and the retaining device 7.

The construction of the corner hinges 5A and 5B, which are basically identical, will be explained in more detail with reference to FIGS. 1, 2, and 3. Each of the corner hinges 5A and 5B comprises two hinge structures with recessed hinge arms 30 which form part of the lid part 3 and which are recessed with respect to the respective lateral sides 32 of the lid part 3. The hinge arms 30 are somewhat resilient in directions towards one another and away from one another and are each provided with a stud 34, said two studs 34 being present at mutually facing sides of the hinge arms 30. The hinges 5A and 5B each further comprise a recessed hinge wall 36 which forms part of the bottom part 1. The hinge walls 36, which lie recessed behind the lateral sides of the bottom part 1 formed by the side walls 1c, are provided with openings 38 into which the respective studs 34 are inserted. The bottom part is provided with corner recesses 40 to enable the placement of the hinge walls 36. The corner hinges 5A and 5B are present essentially in said corner recesses 40. To protect the hinge arm 30, the hinge structures of the corner hinges 5A and 5B have protection walls 42 at the sides 32. The protection walls 42 extend at a certain distance from and for the major part parallel or substantially parallel to the hinge arms 30 and may be made somewhat resilient in transverse direction. The wall portions which are parallel to the hinge arms 30 are indicated by the numeral 42A. In this example the distance d between a hinge arm 30 and its facing wall portion 42A is 9.8 mm. The lid part 3 has two areas 35 which are defined by the hinge structures, i.e. the hinge arms 30 and the protection walls 42, and which cover these structures. In this example the areas 35 are provided with a logo, e.g. representing the type of disc stored in the housing, or a business name. The applied relatively wide distance between the hinge arms and the facing wall portions makes it possible to provide a mold used for manufacturing the lid part with exchangeable insert mold parts representing logos.

In this embodiment, the protection walls 42 are provided with free end portions 44 which are curved towards one another and which extend at some distance from the free ends 46 of the hinge arms 30. The free end portions 44 are connected to the remainder of the walls 42 via fluently curved portions 48 of the protection walls 42. The curved portions 48 extend through at least substantially 90° and form rounded transitions to the rear side formed by the rear wall 1b of the bottom part, thus forming two of the rounded corners 4 of the housing. The protection walls 42 are so positioned in the corner recesses 40 that they lie flush with the side walls 1c of the bottom part 1. Both the entire bottom part 1 and the entire lid part 3 form an integral injection-molded product.

The housing according to the invention shown in FIGS. 4, 5A, and 5B is designed, for example, for the storage of a DVD provided with video information. The dimensions of the housing in this example are: a depth d of 142 mm, a width w of 190 mm, and a height h of 10 mm. The housing is provided with a bottom part 101 and a lid part 103. In the bottom part there is a retaining device 107 comprising a more or less plate-shaped element 107a which is provided with a clamping member 107b for retaining an information carrier 120 with clamping force. The lid part 103 is connected to the bottom part 101 by means of two corner hinges 105A and 105B and is provided with two recessed hinge arms 130 which each lie recessed with respect to a side 132 of the lid part 103. The bottom part 101 is provided with two corner recesses 140 adapted to the hinge arms 130 and bounded by recessed hinge walls 136 which each lie recessed with respect to a side 101c of the bottom part 101. The hinge arms 130 extend in the corner recesses 140 such that the hinge arms 130 and the hinge walls 136 constitute said corner hinges 105A and 105B. The hinge arms 130 are provided with studs 134 here which project into openings 138 of the hinge walls 136. The lid 103 is in addition provided with two protection walls 142, each of the protection walls 142 lying opposite a respective hinge wall 136.

The protection walls 142 are each provided with a free end portion 144, said free end portions 144 being curved towards one another and each extending opposite to and at a distance from one of the hinge arms 130. Each of the projection walls 142 is in addition provided with a fluently curved portion 148 which merges into the end portion 144 such that rounded transitions are formed between the lateral sides 101c and the rear side 101b of the bottom part 101 when the housing is closed, so that the housing will have rounded corners at the areas of the corner recesses 140. To avoid sharp corners also at the front of the housing, the bottom part 101 and the lid part 103 are rounded at the transitions between their fronts and their lateral sides. Sturdy ridges 150 are provided between the hinge arms 130 and the protection walls 142 for reinforcement. The element 107a present in the bottom part 101 is detachably fastened to the bottom part 101, for example by means of two snap closure elements 151. The element 107a is provided with upright walls 153 which extend at some distance from transparent walls 155 of the bottom part 101. An information leaflet 111 extends between the bottom part 101 and the element 107a, upright portions 111a of the leaflet 111 lying protected between said walls 153 and said transparent walls 155. The element 107a is provided with a number, in this example four, of openings or recesses 157 so that the information disc 120 can be easily taken from the housing.

It is noted that the invention is not limited to the embodiments shown; thus, for example, the retaining device and/or some other component relevant to the invention may be constructed in a different manner. It is also possible for the housing to be specifically adapted to different types of disc-shaped information carriers. It is furthermore possible that the housing does not accommodate an insert. In such a case the retaining device may be an integral part of the bottom wall, and the side walls may be locally interrupted, particularly in a central portion.

The invention claimed is:

1. A housing for storing a disc-shaped information carrier, provided with a bottom part, a retaining device for retaining the information carrier, and a lid part connected to the bottom part by two corner hinges, which lid part comprises two hinge structures each provided with a recessed hinge arm which is recessed with respect to a lateral side of the lid part, and with a protection wall present opposite said hinge arm and having a wall portion extending substantially parallel to said hinge arm and at said lateral side of the lid part, and which bottom part is provided with two corner recesses which match the recessed hinge arms and in which the hinge arms extend, said corner recesses being bounded by recessed hinge walls which are each recessed with respect to a lateral side of the bottom part, while the recessed hinge arms are coupled with rotation possibility to the recessed hinge walls for forming said corner hinges, wherein the distance between the recessed hinge arm and the wall portion in each hinge structure has a value which is at least 6.6 mm.

2. The housing as claimed in claim 1, wherein the distance between the recessed hinge arm and the wall portion in each hinge structure is 9.8 mm.

3. The housing as claimed in claim 1, wherein the lid part is plate-shaped and has two areas defined by and covering the hinge structures.

4. The housing as claimed in claim 3, wherein the two areas of the lid part are provided with signs.

5. The housing a claimed in claim 1, wherein the housing has a depth of 142 mm, a width of 124 mm, and a height of 10 mm.

6. The housing as claimed in claim 1, wherein the housing has a depth of 190 mm, a width of 142 mm, and a height of 10 mm.

7. The housing as claimed in claim 1, wherein the lid part is an injection-molded product.

8. The housing as claimed in claim 7, wherein the lid part and the bottom part are made of polystyrene.

9. The housing as claimed in claim 1, wherein the retaining device is pivotably mounted to the housing.

10. A lid for a housing of a disc-shaped information carrier, the lid comprising two hinge structures each provided with a recessed hinge arm which is recessed with respect to a lateral side of the lid part, and with a protection wall present opposite said hinge arm and having a wall portion extending substantially parallel to said hinge arm and at said lateral side of the lid part, and wherein a distance between the recessed hinge arm and the wall portion in each of the two hinge structures has a value which is at least 6.6 mm.

11. A housing for storing a disc-shaped information carrier, the housing comprising a lid part connected to the bottom part by two corner hinges; wherein the lid part comprises two hinge structures each provided with a recessed hinge arm which is recessed with respect to a lateral side of the lid part, and with a protection wall present opposite said hinge arm and having a wall portion extending substantially parallel to said hinge arm and at said lateral side of the lid part, and wherein a distance between the recessed hinge arm and the wall portion in each of the two hinge structures has a value which is at least 6.6 mm.

12. The housing of claim 11, further comprising a bottom part, wherein the bottom part is provided with two corner recesses which match the recessed hinge arms and in which the hinge arms extend, said corner recesses being bounded by recessed hinge walls which are each recessed with respect to a lateral side of the bottom part, while the recessed hinge arms are coupled with rotation possibility to the recessed hinge walls for forming said corner hinges.

13. The housing of claim 11, wherein the distance between the recessed hinge arm and the wall portion in each hinge structure is 9.8 mm.

14. The housing of claim 11, wherein the lid part is plate-shaped and has two areas defined by and covering the hinge structures.

15. The housing of claim 14, wherein the two areas of the lid part are provided with signs.

16. The housing of claim 11, wherein the housing has a depth of 142 mm, a width of 124 mm, and a height of 10 mm.

17. The housing of claim 11, wherein the housing has a depth of 190 mm, a width of 142 mm, and a height of 10 mm.

18. The housing of claim 11, wherein the lid part is an injection-molded product.

19. The housing of claim 11, wherein the lid part is made of polystyrene.

20. The housing of claim 11, further comprising a retaining device for retaining the information carrier, the retaining device being pivotably mounted to the housing.

* * * * *